US006976148B2

(12) United States Patent
Arimilli et al.

(10) Patent No.: US 6,976,148 B2
(45) Date of Patent: Dec. 13, 2005

(54) ACCELERATION OF INPUT/OUTPUT (I/O) COMMUNICATION THROUGH IMPROVED ADDRESS TRANSLATION

(75) Inventors: Ravi Kumar Arimilli, Austin, TX (US); Robert Alan Cargnoni, Austin, TX (US); Guy Lynn Guthrie, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 10/339,766

(22) Filed: Jan. 9, 2003

(65) Prior Publication Data

US 2004/0139295 A1 Jul. 15, 2004

(51) Int. Cl.[7] ............................................. G06F 12/10
(52) U.S. Cl. ................................................... 711/207
(58) Field of Search ........................... 711/206–207

(56) References Cited

U.S. PATENT DOCUMENTS

| | | | |
|---|---|---|---|
| 4,608,629 A | * | 8/1986 | Nagel ........................... 711/202 |
| 5,873,123 A | * | 2/1999 | Patel et al. ................... 711/202 |
| 6,052,773 A | | 4/2000 | DeHon et al. ................. 712/43 |
| 2002/0062409 A1 | | 5/2002 | Lasserre et al. ............... 710/22 |
| 2002/0065990 A1 | | 5/2002 | Chauvel et al. ............. 711/137 |
| 2003/0140205 A1 | | 7/2003 | Dahan et al. ................ 711/163 |

OTHER PUBLICATIONS

U.S. Appl. No. 10/339,723; filed Jan. 9, 2003; by Ravi Kumar Arimilli, et al.; For: High Speed Virtual Instruction Execution Mechanism.
U.S. Appl. No. 10/339,724; filed Jan. 9, 2003; by Ravi Kumar Arimilli, et al.; For: Data Processing System Providing Hardware Acceleration of Input/Output (I/O) Communication.

* cited by examiner

Primary Examiner—Matthew D. Anderson
(74) Attorney, Agent, or Firm—Casimer K. Salys; Dillon & Yudell LLP

(57) ABSTRACT

An I/O communication adapter receives from a processor core an I/O command referencing an effective address within an effective address space of the processor core that identifies a storage location. In response to receipt of the I/O command, the I/O communication adapter translates the effective address into a real address by reference to a translation data structure. The I/O communication adapter then accesses the storage location utilizing the real address to perform an I/O data transfer specified by the I/O command.

23 Claims, 10 Drawing Sheets

INSTRUCTION STREAM BUFFER 340

| K 341 | INSTRUCTION ADDRESS 342 |
|---|---|
| ... | ... |

MEMORY ACCESS CAM 346

| K 347 | TARGET ADDRESS 348 | L/S 349 | I/O 350 | DATA 352 |
|---|---|---|---|---|
| ... | ... | ... | ... | ... |

USER-LEVEL ARCHITECTED STATE CAM 343

| U 344 | REGISTER VALUE 345 | |
|---|---|---|
| | BEGIN | END |
| ... | ... | ... |

ACCELERATION OF INPUT/OUTPUT (I/O) COMMUNICATION THROUGH IMPROVED ADDRESS TRANSLATION

BACKGROUND OF THE INVENTION

1. Technical Field

The present invention relates in general to data processing and, in at least one aspect, to input/output (I/O) communication by a data processing system.

2. Description of the Related Art

In a conventional data processing system, input/output (I/O) communication is typically facilitated by a memory-mapped I/O adapter that is coupled to the processing unit(s) of the data processing system by one or more internal buses. For example, FIG. 1 illustrates a prior art Symmetric Multiprocessor (SMP) data processing system 8 including a Peripheral Component Interconnect (PCI) I/O adapter 50 that supports I/O communication with a remote computer 60 via an Ethernet communication link 52.

As illustrated, prior art SMP data processing system 8 includes multiple processing units 10 coupled for communication by an SMP system bus 11. SMP system bus may include, for example, an 8-byte wide address bus and a 16-byte wide data bus and may operate at 500 MHz. Each processing unit 10 includes a processor core 14 and a cache hierarchy 16, and communicates with an associated memory controller (MC) 18 for an external system memory 12 via a high speed (e.g., 533 MHz) private memory bus 20. Processing units 10 are typically fabricated utilizing advanced, custom integrated circuit (IC) technology and may operate at processor clock frequencies of 2 GHz or more.

Communication between processing units 10 is fully cache coherent. That is, the cache hierarchy 16 within each processing unit 10 employs the conventional Modified, Exclusive, Shared, Invalid (MESI) protocol or a variant thereof to track how current each cached memory granule accessed by that processing unit 10 is with respect to corresponding memory granules within other processing units 10 and/or system memory 12.

Coupled to SMP system bus 11 is mezzanine I/O bus controller 30, and optionally, one or more additional mezzanine bus controllers 32. Mezzanine I/O bus controller 30 (and each other mezzanine bus controller 32) interfaces a respective mezzanine bus 40 to SMP system bus 11 for communication. In a typical implementation, mezzanine bus 40 is much narrower, and operates at a lower frequency than SMP system bus 11. For example, mezzanine bus 40 may be 8 bytes wide (with multiplexed address and data) and may operate at 200 MHz.

As shown, mezzanine bus 40 supports the attachment of a number of 10 channel controllers (IOCCs), including Microchannel Architecture (MCA) IOCC 42, PCI Express (3GIO) IOCC 44, and PCI IOCC 46. Each of IOCCs 42–46 is coupled to a respective bus 47–49 that provides slots to support the connection of a fixed maximum number of devices. In the case of PCI IOCC 46, the attached devices includes a PCI I/O adapter 50 that supports communication with network 54 and remote computer 60 via an I/O communication link 52.

It should be noted that I/O data and "local" data within data processing system 8 belong to different coherency domains. That is, while cache hierarchies 16 of processing units 10 employ the conventional MESI protocol or a variant thereof to maintain coherency, data granules cached within mezzanine I/O bus controller 30 for transfer to remote computer 60 are usually stored in either Shared state, or if a data granule is subsequently modified within data processing system 8, Invalid state. In most systems, no Exclusive, Modified or similar exclusive states are supported within data processing system 8 for I/O data. In addition, all incoming I/O data transfers are store-through operations, rather than read-before-write (e.g., read-with-intent-to-modify (RWITM) and DCLAIM) operations, as are employed by processing units 10 to modify data.

With the general hardware implementation described above, a typical method by which SMP data processing system 8 transmits data over I/O communication link 52 can be described as a three-part operation in which an application process, the operating environment software (e.g., the OS and associated device drivers), and the I/O adapter (and other hardware) each perform a part.

At any given time, the processing units 10 of SMP data processing system 8 typically execute a large number of application processes concurrently. In the most simple case, when one of these processes needs to transmit data from system memory 12 to remote computer 60 via I/O channel 52, the process first must contend with other processes to obtain a lock for I/O adapter 50. Depending upon the reliability of the intended transmission protocol and other factors, the process may also have to obtain one or more locks for the data granule(s) to be transmitted in order to ensure that the data granules are not modified by another process prior to transmission.

Once the process has obtained a lock for I/O adapter 50 (and possibly lock(s) for the data granules to be transmitted), the process makes one or more calls to the operating system (OS) via the OS socket interface. These socket interface calls include requests for the operating system to initialize a socket, bind a socket to a port address, indicate readiness to accept a connection, send and/or receive data, and close a socket. In these socket calls, the calling process generally specifies the protocol to be utilized (e.g., TCP, UDP, etc.), a method of addressing, a base effective address (EA) of the data granules to be transmitted, data size, and a foreign address indicating a destination memory location within remote computer 60.

Turning now to the operating environment software, the OS, following boot, performs various operations to create resources for I/O communication, including allocating an I/O address space separate from the virtual (or effective) address space employed internally by processing units 10 and creating a Translation Control Entry (TCE) table 24 in system memory 12. TCE table 24 supports Direct Memory Access (DMA) services utilized to perform I/O communication by providing TCEs that translate between I/O addresses generated by I/O devices and RAs within system memory 12.

Following creation of these and other resources, the OS responds to the socket interface calls of various processes by providing services supporting I/O communication. For example, the OS first translates the EA contained in a socket interface call into a real address (RA) and then determines a page of PCI I/O address space to map to the RA, for example, by hashing the RA. In addition, the OS dynamically updates TCE table 24 in system memory 12 to support DMA services utilized to perform the requested I/O communication. Of course, if no TCE within TCE table 24 is currently available for use, the OS must either victimize a TCE from TCE table 24 and inform the affected process that its DMA has been terminated, or alternatively, request the process to release the needed TCE.

In most data processing systems, the OS then creates a Command Control Block (CCB) 22 in memory 12 that specifies the parameters of the data transfer by I/O adapter 50. For example, CCB 22 may contain one or more PCI address space addresses specifying locations within system memory 12, a data size associated with each such address, and a foreign address of a CCB within remote computer 60. Following establishment of a TCE and CCB 22 for the data transfer, the OS returns the base address of CCB 22 to the calling process. Depending upon the protocol employed, the OS may also provide additional data processing services (e.g., by encapsulating the data with headers, providing flow control, etc.).

In response to receipt of the base address of CCB 22, the process initiates data transfer from system memory 12 to remote computer 60 by writing a register within PCI I/O adapter 50 with the base address of CCB 22. In response to this invocation, PCI I/O adapter 50 performs a DMA read of CCB 22 utilizing the base address written in its register by the calling process. (In some simple systems, address translation is not required for the DMA read of CCB 22 since CCB 22 resides in a non-translated address region; however, in higher end server class systems, address translation is typically performed for the DMA read of CCB 22). Adapter 50 then reads CCB 22 and issues a DMA read operation targeting the base PCI address space address (which was read from CCB 22) of the first data granule to be transmitted to remote computer 60.

In response to receipt of the DMA read operation from PCI adapter 50, PCI IOCC 46 accesses its internal TCE cache to locate a translation for the specified target address. In response to a TCE cache miss, PCI IOCC 46 performs a read of TCE table 24 to obtain the relevant TCE. Once PCI IOCC 46 obtains the needed TCE, PCI IOCC 46 translates the PCI address space address specified within the DMA read operation into a RA by reference to the TCE, performs a DMA read of system memory 12, and returns the requested I/O data to PCI I/O adapter 50. After possible further processing by PCI I/O adapter 50 (e.g., to satisfy the requirements of the link-layer protocol), PCI I/O adapter 50 transmits the data granule over I/O communication link 52 and network 54 to remote computer 60 together with a foreign address of a CCB within remote computer 60 that controls storage of the data granule in the system memory of remote computer 60.

The foregoing process of DMA read operations and data transmission continues until PCI I/O adapter 50 has transmitted all data specified within CCB 22. PCI I/O adapter 50 thereafter asserts an interrupt to signify that the data transfer is complete. As understood by those skilled in the art, the assertion of an interrupt by PCI I/O adapter 50 triggers a context switch and execution of a first-level interrupt handler (FLIH) by one of processing units 10. The FLIH then reads a system interrupt control register (e.g., within mezzanine I/O bus controller 30) to determine that the interrupt originated from PCI IOCC 46, reads the interrupt control register of PCI IOCC 46 to determine that the interrupt was generated by PCI I/O adapter 50, and then calls the second-level interrupt handler (SLIH) of PCI I/O adapter 50 to read the interrupt control register of PCI I/O adapter 50 to determine which of possibly multiple DMAs completed. The FLIH then sets a polling flag to indicate to the calling process that the I/O data transfer is complete.

SUMMARY OF THE INVENTION

The present invention recognizes that conventional I/O communication outlined above is inefficient. As noted above, the OS provides TCE tables in memory to permit an IOCC to translate addresses from the I/O domain into real addresses in system memory. The overhead associated with the creation and management of TCE tables in system memory decreases operating system performance, and the translation of I/O addresses by the IOCC adds latency to each I/O data transfer. Further latency is incurred by the use of locks to synchronize access by multiple processes to the I/O adapter and system memory, as well as by arbitrating for access to, and converting between the protocols implemented by the I/O (e.g., PCI) bus, the mezzanine bus, and SMP system bus. Moreover, the transmission of I/O data transfers over the SMP system bus consumes bandwidth that could otherwise be utilized for possibly performance critical communication (e.g., of read requests and synchronizing operations) between processing units.

The performance of a conventional data processing system is further degraded by the use of interrupt handlers to enable communication between I/O adapters and calling processes. As noted above, in a conventional implementation, an I/O adapter asserts an interrupt when a data transfer is complete, and an interrupt handler sets a polling flag in system memory to inform the calling process that the data transfer is complete. The use of interrupts to facilitate communication between I/O adapters and calling processes is inefficient because it requires two context switches for each data transfer and consumes processor cycles executing interrupt handler(s) rather than performing useful work.

The present invention further recognizes that it is undesirable in many cases to manage I/O data within a different coherency domain than other data within a data processing system.

The present invention also recognizes that data processing system performance can further be improved by bypassing unnecessary instructions, for example, utilized to implement I/O communication. For example, for I/O communication that employs multiple layered protocols (e.g., TCP/IP), transmission of a datagram between computers requires the datagram to traverse the protocol stack at both the sending computer and the receiving computer. For many data transfers, instructions within at least some of the protocol layers are executed repetitively, often with no change in the resulting address pointers, data values, or other execution results. Consequently, the present invention recognizes that I/O performance, and more generally data processing system performance, can be significantly improved by bypassing instructions within such repetitive code sequences.

The present invention addresses the foregoing and additional shortcomings in the art by providing improved processing units, data processing systems and methods of data processing. In at least one embodiment of the present invention, an I/O communication adapter receives from a processor core an I/O command referencing an effective address within an effective address space of the processor core that identifies a storage location. In response to receipt of the I/O command, the I/O communication adapter translates the effective address into a real address by reference to a translation data structure. The I/O communication adapter then accesses the storage location utilizing the real address to perform an I/O data transfer specified by the I/O command.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 9 is a more detailed diagram of a bypass CAM in accordance with a preferred embodiment of the present invention.

DETAILED DESCRIPTION OF ILLUSTRATIVE EMBODIMENT

Figure 2:
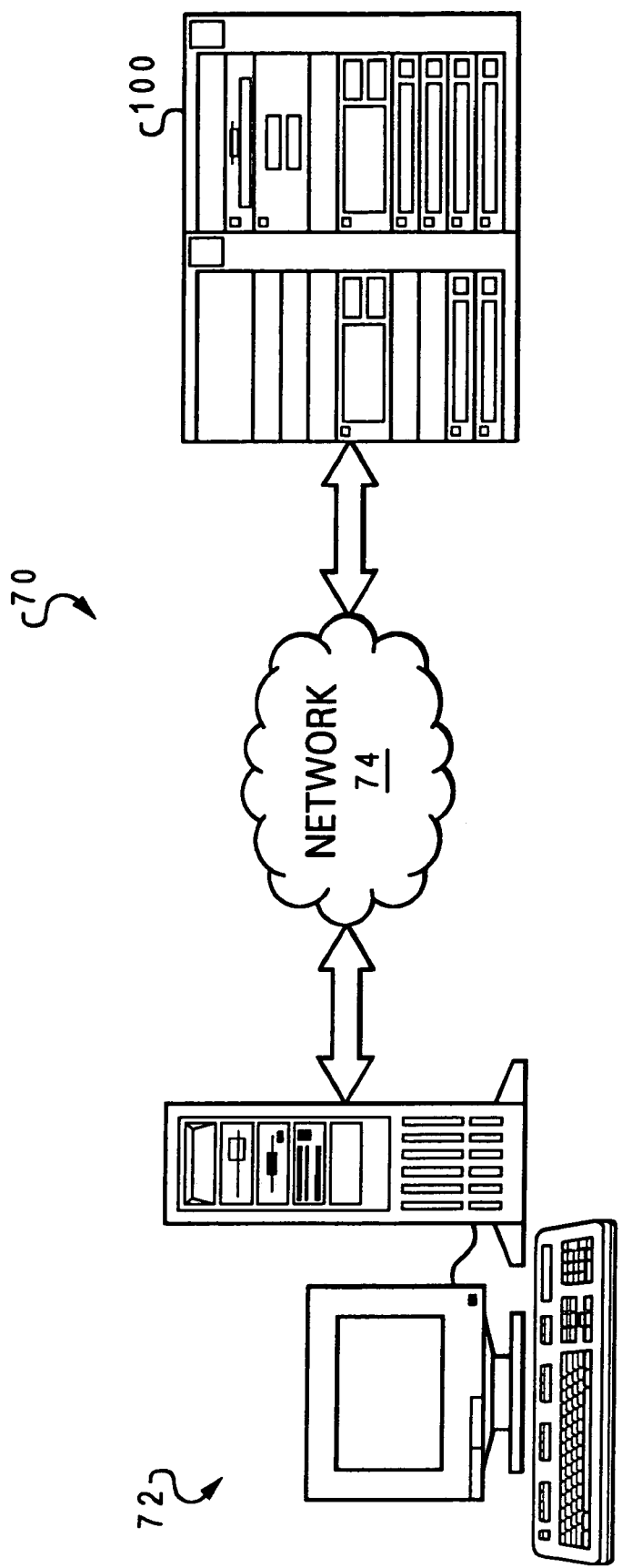
FIG. 2 illustrates an exemplary network system in which the present invention may advantageously be utilized.

With reference again to the figures and in particular with reference to FIG. 2, there is illustrated an exemplary network system 70 in which the present invention may advantageously be utilized. As illustrated, network system 70 includes at least two computer systems (i.e., workstation computer system 72 and server computer system 100) coupled for data communication by a network 74. Network 74 may comprise one or more wired, wireless, or optical Local Area Networks (e.g., a corporate intranet) or Wide Area Networks (e.g., the Internet) that employ any number of communication protocols. Further, network 74 may include either or both packet-switched and circuit-switched subnetworks. As discussed in detail below, in accordance with the present invention, data may be transferred by or between workstation 72 and server 100 via network 74 utilizing innovative methods, systems, and apparatus for input/output (I/O) data communication.

Figure 3:
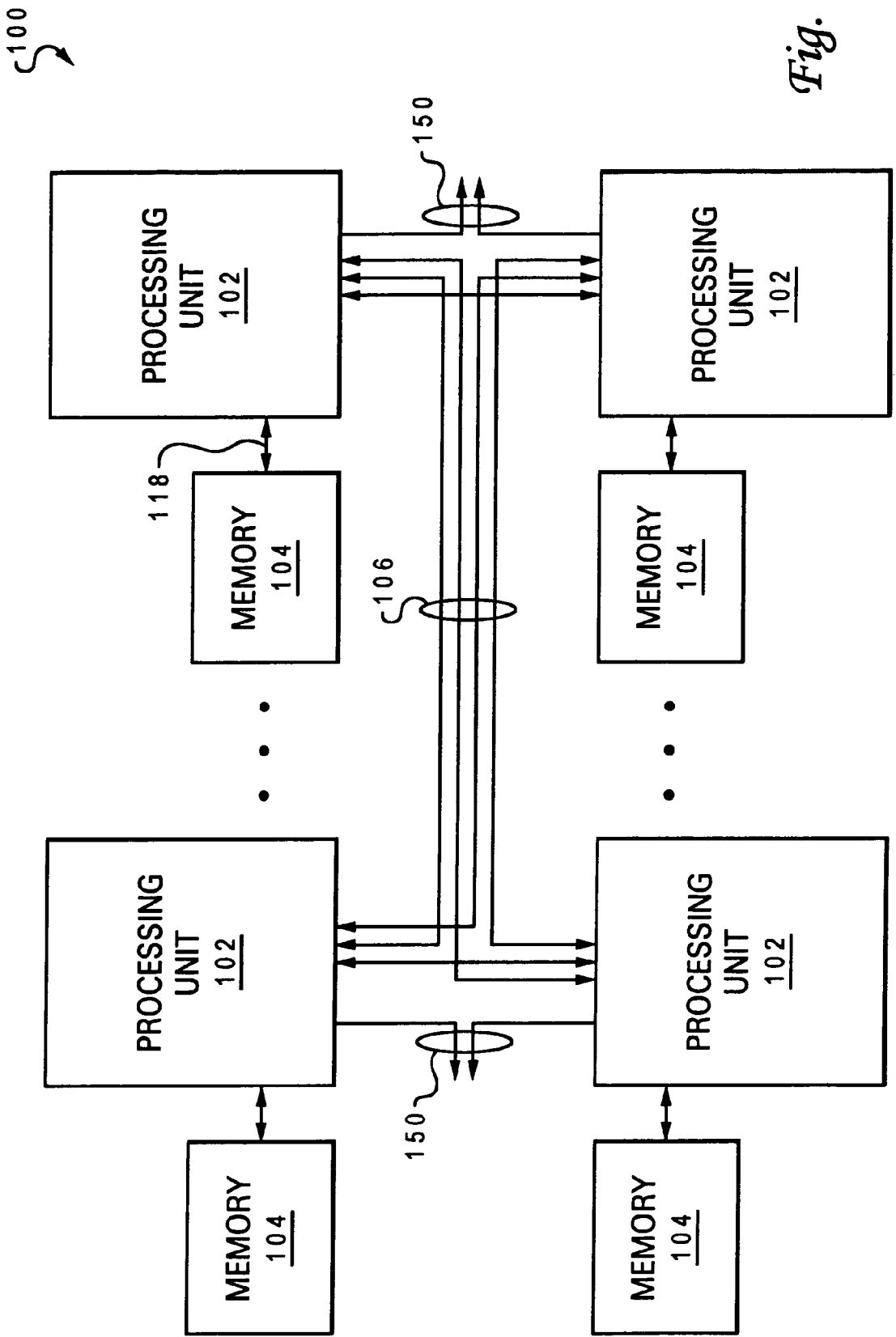
FIG. 3 depicts a block diagram of an exemplary embodiment of a multiprocessor (MP) data processing system in accordance with the present invention.

Referring now to FIG. 3, there is depicted an exemplary embodiment of multiprocessor (MP) server computer system 100 that supports improved data processing, including improved I/O communication, in accordance with the present invention. As illustrated, server computer system 100 includes multiple processing units 102, which are each coupled to a respective one of memories 104. Each processing unit 102 is further coupled to an integrated and distributed switching fabric 106 that supports communication of data, instructions, and control information between processing units 102. Each processing unit 102 is preferably implemented as a single integrated circuit comprising a semiconductor substrate having integrated circuitry formed thereon. Multiple processing units 102 and at least a portion of switching fabric 106 may advantageously be packaged together on a common backplane or chip carrier.

As further illustrated in FIG. 3, in accordance with the present invention, one or more of processing units 102 are coupled to I/O communication links 150 for I/O communication independent of switching fabric 106. As described further below, coupling processing units 102 to communication links 150 permits significant simplification of and performance improvement in I/O communication.

Those skilled in the art will appreciate that data processing system 100 can include many additional unillustrated components. Because such additional components are not necessary for an understanding of the present invention, they are not illustrated in FIG. 3 or discussed further herein. It should also be understood, however, that the enhancements to I/O communication provided by the present invention are applicable to data processing systems of any system architecture and are in no way limited to the generalized MP architecture or SMP system structure illustrated in FIG. 3.

Figure 4:
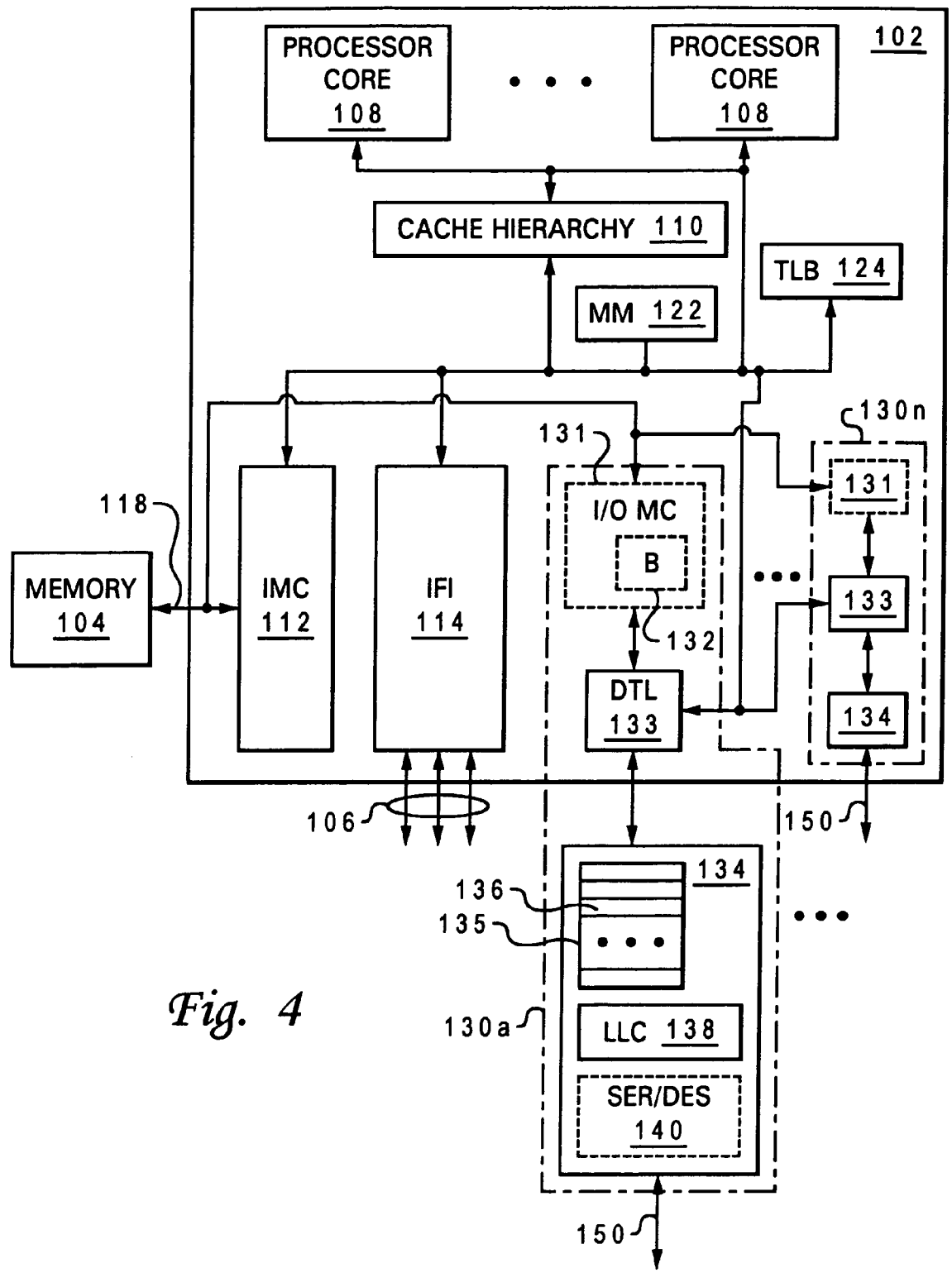
FIG. 4 is a more detailed block diagram of a processing unit within the data processing system of FIG. 3.

With reference now to FIG. 4, there is illustrated a more detailed block diagram of an exemplary embodiment of a processing unit 102 within server computer system 100. As depicted, the integrated circuitry within processing unit 102 includes one or more processor cores 108 that can each independently and concurrently execute one or more instruction threads. Processing unit 102 further includes a cache hierarchy 110 coupled to processor cores 108 to provide low latency storage for data and instructions likely to be accessed by processor cores 108. Cache hierarchy 110 may include, for example, separate bifurcated level one (L1) instruction and data caches for each processor core 108 and a large level two (L2) cache shared by multiple processor cores 108. Each such cache may include a conventional (or unconventional) cache array, cache directory and cache controller. Cache hierarchy 110 preferably implements the well known Modified, Exclusive, Shared, Invalid (MESI) cache coherency protocol or a variant thereof within its cache directories to track the coherency states of cached data and instructions.

Cache hierarchy 110 is further coupled to an integrated memory controller (IMC) 112 that controls access to a memory 104 coupled to the processing unit 102 by a high frequency, high bandwidth memory bus 118. Memories 104 of all of processing units 102 collectively form the lowest level of volatile memory (often called "system memory") within server computer system 100, which is generally accessible to all processing units 102.

Processing unit 102 further includes an integrated fabric interface (IFI) 114 for switching fabric 106. IFI 114, which is coupled to both IMC 112 and cache hierarchy 110, includes master circuitry that masters operations requested by processor cores 108 on switching fabric 106, as well as snooper circuitry that responds to operations received from switching fabric 106 (e.g., by snooping the operations against cache hierarchy 110 to maintain coherency or by retrieving requested data from the associated memory 104).

Processing unit 102 also has one or more external communication adapters (ECAs) 130 coupled to processor cores 108 and memory bus 118. Each ECA 130 supports I/O communication with a device or system external to the MP subsystem (or optionally, external to server computer system 100) of which processing unit 102 forms a part. To provide a variety of I/O communication options, processing units 102 may each or collectively be provided with ECAs 130 implementing diverse communication protocols (e.g., Ethernet, SONET, PCI Express, InfiniBand, etc.).

In a preferred embodiment, each of IMC 112, IFI 114 and ECAs 130 is a memory mapped resource having one or more operating system assigned effective (or real) addresses. In such embodiments, processing unit 102 is equipped with a memory map (MM) 122 that records the assignment of addresses to IMC 112, IFI 114 and ECAs 130. Each processing unit 102 is therefore able to route a command (e.g., an I/O write command or a memory read request) to the any of IMC 112, IFI 114 and ECAs 130 based upon the type of command and/or the address mapping provided within memory map 122. It should be noted that, in a preferred embodiment, IMC 112 and ECAs 130 do not have any affinity to the particular processor cores 108 integrated within the same die, but are instead accessible by any processor core 108 of any processing unit 102. Moreover, ECAs 130 can access any memory 104 within server computer system 100 to perform I/O read and I/O write operations.

Examining ECAs 130 more specifically, each ECA 130 includes at least data transfer logic (DTL) 133 and protocol logic 134, and may further include an optional I/O memory controller (I/O MC) 131. DTL 133 includes control circuitry that arbitrates between processor cores 108 for access to communication links 150 and controls the transfer of data between a communication link 150 and a memory 104 in response to I/O read and I/O write commands by processor cores 108. To access memory 104, DTLs 133 may issue memory read and memory write requests to any IMC 112, or alternatively, access memory 104 by issuing such memory access requests to dedicated I/O MCs 131. I/O MCs 131 may include optional buffer storage 132 to buffer multiple memory access requests and/or inbound or outbound I/O data.

The DTL 133 of each ECA 130 is further coupled to a Translation Lookaside Buffer (TLB) 124, which buffers copies of a subset of the Page Table Entries (PTEs) utilized to translate effective addresses (EAs) employed by processor cores 108 into real addresses (RAs). As utilized herein, an effective address (EA) is defined as an address that identifies a memory storage location or other resource mapped to a virtual address space. A real address (RA), on the other hand, is defined herein as an address within a real address space that identifies a real memory storage location or other real resource. TLB 124 may be shared with one or more processor cores 108 or may alternatively comprise a separate TLB dedicated for use by one or more of DTLs 133.

In accordance with an important aspect of the present invention and as described in detail below with reference to FIG. 7, DTLs 133 access TLB 124 to translate into RAs the target EAs specified by processor cores 108 as the source or destination addresses of I/O data to be transferred in I/O operations. Consequently, the prior art use of TCEs 24 (see FIG. 1) to perform I/O address translation and the concomitant OS overhead to create and manage TCEs in system memory is completely eliminated by the present invention.

Referring again to ECA 130, protocol logic 134 includes a data queue 135 containing a plurality of entries 136 for buffering inbound and outbound I/O data. As described below, these hardware queues maybe supplemented with virtual queues within buffer 132 and/or memory 104. In addition, protocol logic 134 includes a link layer controller (LLC) 138 that processes outbound I/O data to implement the Layer 2 protocol of communication link 150 and that processes inbound I/O data, for example, to remove Layer 2 headers and perform other data formatting. In typical applications, protocol logic 134 further includes a serializer/deserializer (SER/DES) 140 that serializes outbound data to be transmitted on communication link 150 and deserializes inbound data received from communication link 150.

It should be appreciated that although each ECA 130 is illustrated in FIG. 4 as having entirely separate circuitry for ease of understanding, in some embodiments multiple ECAs 130 can share common circuitry to promote efficient use of die area. For example, multiple ECAs 130 may share a single I/O MC 131. Alternatively or additionally, multiple instances of protocol logic 134 may be controlled by and connected to a single instance of DTL 133. Such alternative embodiments should be understood as falling within the scope of the present invention.

As further depicted in FIG. 4, the portion of each ECA 130 integrated within processing unit 102 is implementation-specific, and will vary between differing embodiments of the present invention. For example, in the exemplary embodiment, the I/O MC 131 and DTL 133 of ECA 130a are integrated within processing unit 102, while protocol logic 134 of ECA 130a is implemented as an off-chip Application Specific Integrated Circuit (ASIC) in order to reduce the pin count and die size of processing unit 102. ECA 130n, by contrast, is entirely integrated within the substrate of processing unit 102.

Figure 1:
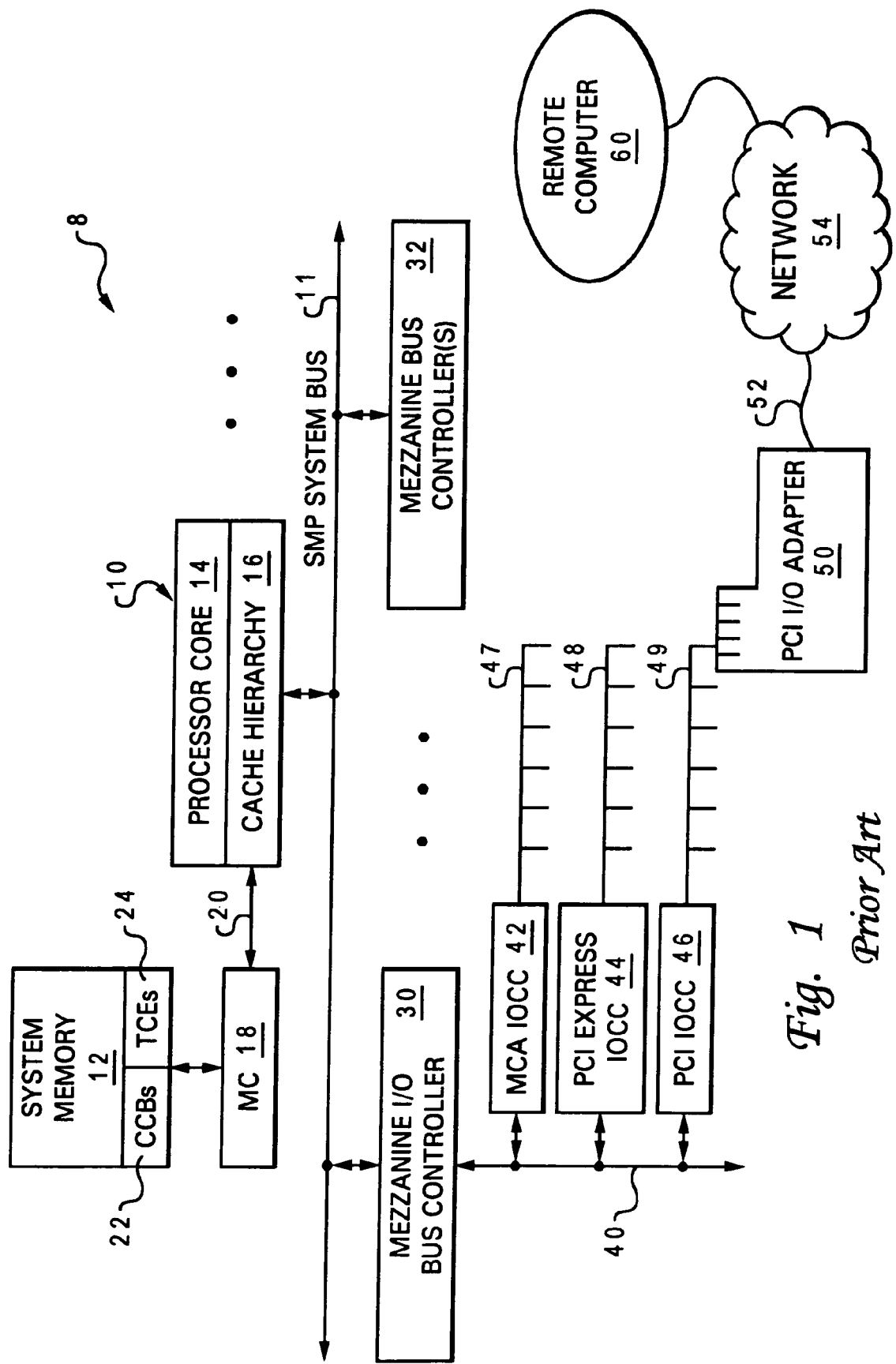
FIG. 1 depicts a Symmetric Multiprocessor (SMP) data processing system in accordance with the prior art.

It should be noted that each ECA 130 is significantly simplified as compared to prior art I/O adapters (e.g., PCI I/O adapter 50 of FIG. 1). In particular, prior art I/O adapters typically contain SMP bus interface logic, as well as one or more hardware or firmware state machines to maintain the state of various active sessions and "in flight" bus transactions. Because I/O communication is not routed over conventional SMP buses, ECAs 130 do not require conventional SMP bus interface circuitry. Moreover, as discussed below in detail with respect to FIGS. 5 and 7, such state machines are reduced or eliminated in ECA 130 through the storage of session state information in memory together with the I/O data.

It should further be noted that the incorporation of I/O hardware within processing unit 102 permits I/O data communication to be fully cache coherent in the same manner as data communication over switching fabric 106. That is, the cache hierarchy 110 within each processing unit 102 preferably updates the coherency states of cached data granules as appropriate in response to detecting I/O read and write operations transferring cacheable data. For example, cache hierarchy 110 invalidates cached data granules having addresses matching addresses specified within an I/O read operation. Similarly, cache hierarchy 110 updates the coherency states of data granules cached within cache hierarchy 110 from an exclusive cache coherency state (e.g., the MESI Exclusive or Modified states) to a shared state (e.g., the MESI Shared state) in response to an I/O write operation specifying addresses matching the addresses of the cached data granules. In addition, data granules transmitted in an I/O write operation may be transmitted in a modified state (e.g., the MESI Modified state) or exclusive state (e.g., the MESI Exclusive or Modified states), rather than being restricted to Shared and Invalid states. In response to snooping such data transfers, cache hierarchy 110 will invalidate (or otherwise update the coherency state of) corresponding cache lines.

In many cases, I/O communication affecting the coherency state of cached data will be snooped by the cache hierarchies 110 of multiple processing units 102 due to the communication of I/O data between a memory 104 and ECA 130 across switching fabric 106. In some instances, however, the ECA 130 and memory 104 involved in a particular I/O communication session may both be associated with the same processing unit 102. Consequently, the I/O read and I/O write operations within the I/O session will be transmitted internally within the processing unit 102 and will not be visible to other processing units 102. In such instance, either the master (e.g., ECA 130) or snooper (e.g., IFI 114 or IMC 112) of the I/O data transfer preferably transmits one or more address-only data kill or data-shared coherency operations on switching fabric 106 to force cache hierarchies 110 in other processing units 102 to update the directory entries associated with the I/O data to the appropriate cache coherency state.

Figure 5:
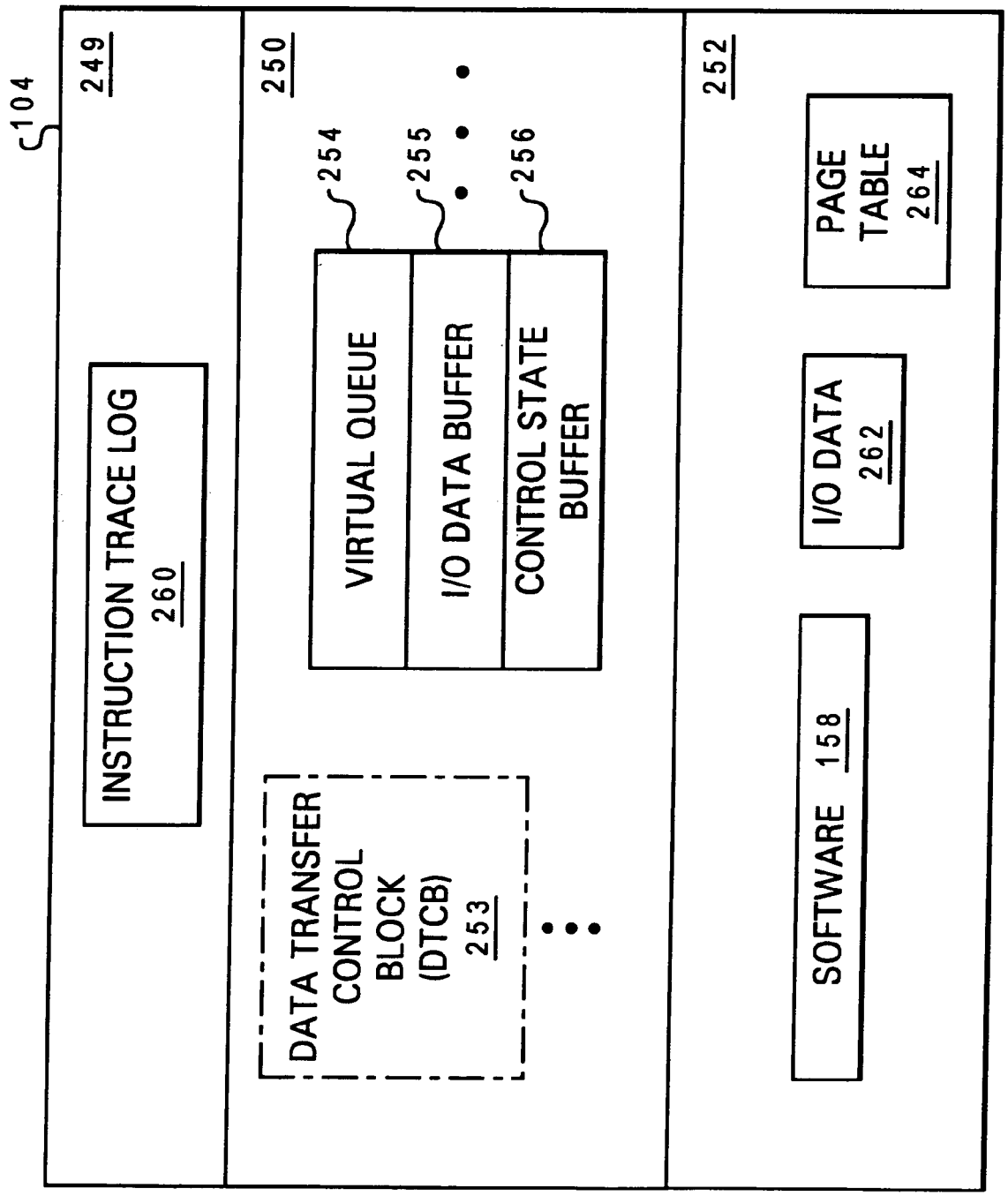
FIG. 5 is a block diagram illustrating I/O data structures and other contents of a system memory within the MP data processing system depicted in FIG. 3 in accordance with a preferred embodiment of the present invention.

Referring now to FIG. 5, there is depicted a more detailed block diagram of the contents of a memory 104 coupled to a processing unit 102 within server computer system 100. Memory 104 may comprise, for example, one or more dynamic random access memory (DRAM) devices.

As shown, hardware and/or software preferably partitions the storage available within memory 104 into at least one processor region 249 allocated to the processor cores 108 of the associated processing unit 102, at least one I/O region 250 allocated to one or more ECAs 130 of the associated processing unit 102, and a shared region 252 allocated to and accessible by all processing units 102 within server computer system 100. Processor region 249 stores an optional instruction trace log 260 listing instructions executed by each processor cores 108 of the associated processing unit 102. Depending upon the desired implementation, the instruction trace logs of all processor cores 108 may be stored in the same processor region 249, or each processor core 108 may store its respective instruction trace log 260 in its own private processor region 249.

I/O region 250 may store one or more Data Transfer Control Blocks (DTCB) 253 each specifying parameters for a respective I/O data transfer. I/O region 250 preferably further includes, for each ECA 130 or for each I/O session, a virtual queue 254 supplementing the physical hardware queue 135 within protocol logic 134, an I/O data buffer 255 providing temporary storage of inbound or outbound I/O data, and a control state buffer 256 that buffers control state information for the I/O session or ECA 130. For example, control state buffer 256 may buffer one or more I/O commands until such commands are ready to be processed by DTL 133. In addition, for I/O connections that employ the notion of a session state, control state buffer 256 may store session state information, possibly in conjunction with pointers or other structured association with the I/O data stored in I/O data buffer 255.

As further illustrated in FIG. 5, shared region 252 may contain at least a portion of the software 158 that maybe executed by the various processing units 102 and I/O data 262 that has been received by or that is to be transmitted by one of processing units 102. In addition, shared region 252 further includes an OS-created page table 264 containing at least a portion of the Page Table Entries (PTEs) utilized to translate between effective addresses (EAs) and real addresses (RAs), as discussed above.

Figure 6:
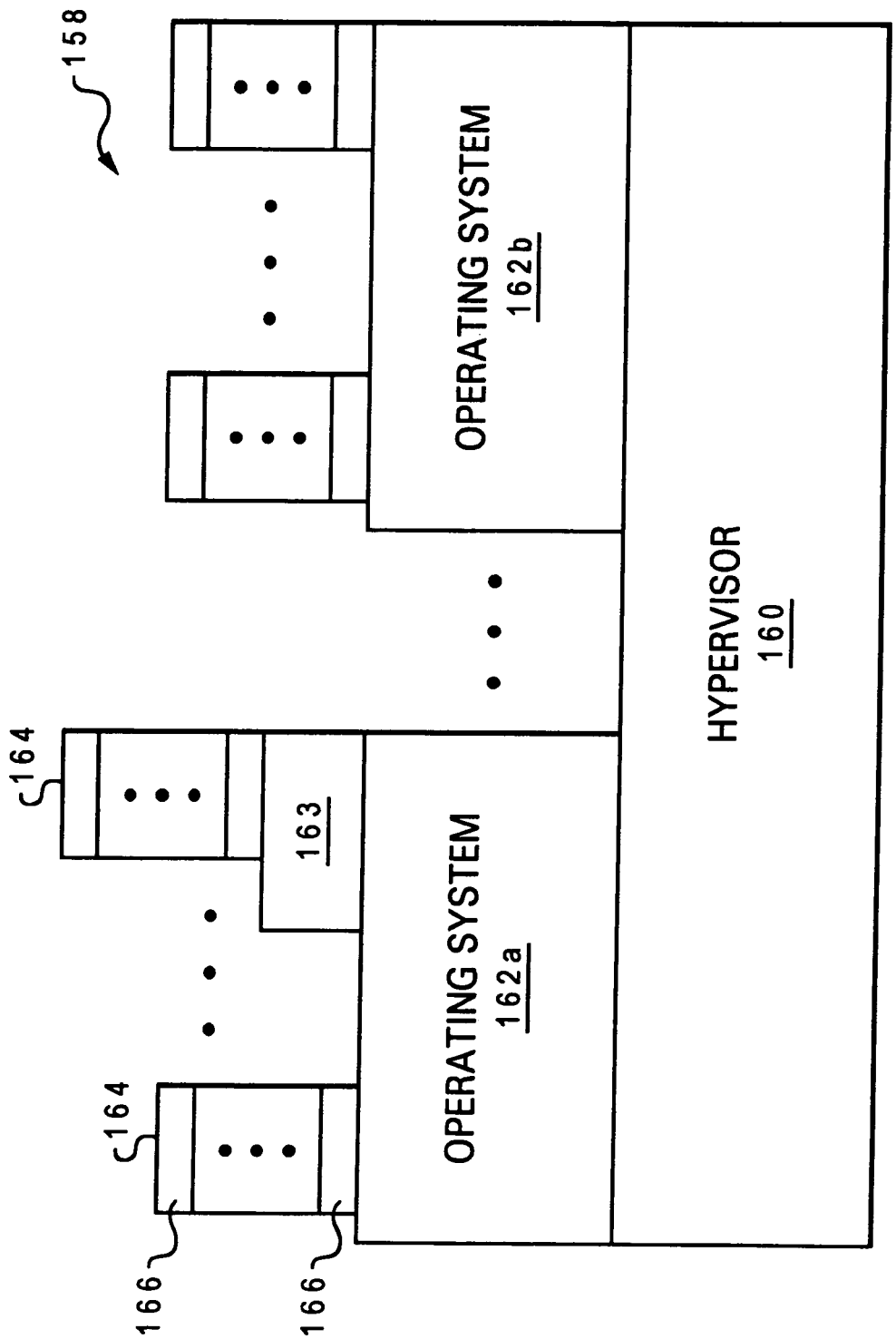
FIG. 6 is a layer diagram of illustrating exemplary software executing within the MP data processing system of FIG. 3.

With reference now to FIG. 6, there is illustrated a software layer diagram of an exemplary software configuration 158 of server computer system 100 of FIGS. 2–3. As illustrated, the software configuration has at its lowest level a system supervisor (or hypervisor) 160 that allocates resources among one or more operating systems 162 concurrently executing within data processing system 8. The resources allocated to each instance of an operating system 162 are referred to as a partition. Thus, for example, hypervisor 160 may allocate two processing units 102 to the partition of operating system 162a, four processing units 102 to the partition of operating system 162b, multiple partitions to another processing unit 102 (by time slicing or multi-threading), etc., and certain ranges of real and effective address spaces to each partition.

Running above hypervisor 160 are operating systems 162, middleware 163, and application programs 164. As well understood by those skilled in the art, each operating systems 162 allocates addresses and other resources from the pool of resources allocated to it by hypervisor 160 to various hardware components and software processes, independently controls the operation of the hardware allocated to its partition, creates and manages page table 264, and provides various application programing interfaces (API) through which operating system services can be accessed by its application programs 164. These OS APIs include a socket interface and other APIs that support I/O data transfers.

Application programs 164, which can be programmed to perform any of a wide variety of computational, control, communication, data management and presentation functions, comprise a number of user-level processes 166. As noted above, to perform I/O data transfers, processes 166 make calls to the underlying OS 162 via the OS API to request various OS services supporting the I/O data transfers.

Figure 7:
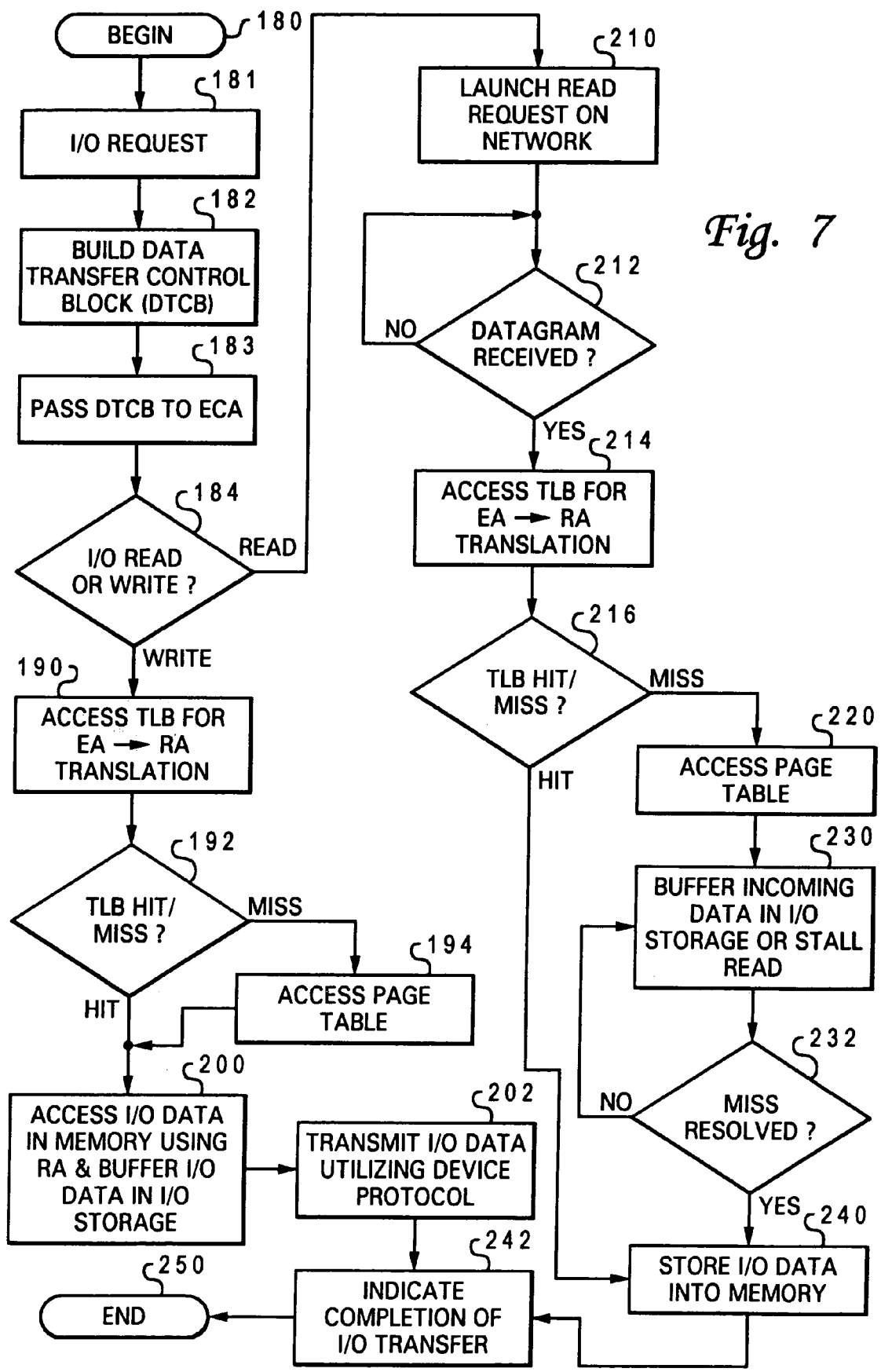
FIG. 7 is a high level logical flowchart of an exemplary method of I/O communication in accordance with the present invention.

Referring now to FIG. 7, there is illustrated a high level logical flowchart of an exemplary method of I/O data communication in accordance with the present invention. The process illustrated in FIG. 7 will be described with further reference to the hardware illustrated in FIG. 4 and the memory diagram provided in FIG. 5.

As shown, the process of FIG. 7 begins at block 180 and then proceeds to block 181, which illustrates a requesting process (e.g., an application, middleware or OS process) issuing an I/O request for an I/O read or I/O write operation. Importantly, there is no requirement that the requesting process obtain an adapter or memory lock for the requested I/O operation because the integration of ECA(s) 130 within a processing unit 102 and the communication it affords permits an ECA 130 to "hold off" I/O commands by processor cores 108 until the I/O commands can be serviced, and alternatively or additionally, to buffer a large number of I/O commands for subsequent processing in buffer 132 and/or control state buffer 256. As discussed below, the "hold off" time, if any, can be minimized by locally buffering the I/O data in one of buffers 132 or 255.

Depending upon the desired programming model, the I/O request by the requesting process can be handled either with or without OS involvement (and this can be made selective, depending upon a field within the I/O request). If the I/O request is to be handled by the OS, the I/O request is preferably an API call requesting I/O communication services from an OS 162. In response to the API call, the OS 162 builds a Data Transfer Control Block (DTCB) specifying parameters for the requested I/O transfer, as shown at block 182. The OS 162 may then pass an indication of the storage location (e.g., base EA) of the DTCB back to the requesting process.

Alternatively, if the I/O request is to handled without OS involvement, the process preferably builds the DTCB, as shown at block 182, and may do so prior to or concurrently with issuing the I/O request at block 181. In this case, the I/O request is preferably an I/O command transmitted by a processor core 108 to a DTL 133 of a selected ECA 130 to provide the base EA of the DTCB to the ECA 130.

As shown in FIG. 5, the DTCB may be built within the local memory 104 of the processing unit 102 at reference numeral 253. Alternatively, the DTCB may be built within a processor core 108, either in a special purpose storage location or in a general purpose register set. In an exemplary embodiment, the DTCB includes fields indicating at least the following: (1) whether the I/O data transfer is an I/O read of inbound I/O data or an I/O write of outbound I/O data, (2) one or more effective addresses (EAs) identifying one or more storage locations (e.g., in system memory 104) from which or into which I/O data will be transferred by the I/O operation, and (3) at least a portion of a foreign address (e.g., an Internet Protocol (IP) address) identifying a remote device, system, or memory location that will receive or provide the I/O data.

The process illustrated in FIG. 7 thereafter proceeds to block 183, which depicts passing the DTCB to the DTL 133 of the selected ECA 130. As will be appreciated, the DTCB can either be "pushed" to the DTL 133 by the processor core 108, or alternatively, may be "pulled" by DTL 133, for example, by issuing one or more memory read operations to I/O MC 131 or IMC 112. (Such memory read operations may require EA-to-RA translation utilizing TLB 124.) In response to receipt of the DTCB, DTL 133 examines the DTCB to determine if the requested I/O operation is an I/O read or an I/O write. If the DTCB specifies an I/O read operation, the process depicted in FIG. 7 proceeds from block 184 to block 210, which is described below. However, if the DTCB specifies an I/O write operation, the process of FIG. 7 proceeds from block 184 to block 190.

Block 190 illustrates DTL 133 accessing TLB 124 (see FIG. 4) to translate one or more EAs of I/O data specified within the DTCB into RAs that can be utilized to access the I/O data in one or more memories 104. If the PTE needed to perform the effective-to-real address translation resides within TLB 124, a TLB hit occurs at block 192, and TLB 124 provides the corresponding RA(s) to DTL 133. The process then proceeds from block 192 to block 200, which is described below. However, if the required PTE is not currently buffered within TLB 124, a TLB miss occurs at block 192, and the process proceeds to block 194. Block 194 illustrates the OS performing a conventional TLB reload operation to load into TLB 124 the PTE from page table 264 required to perform the effective-to-real translation. The process the passes to block 200.

Block 200 illustrates DTL 133 accessing the I/O data identified in the DTCB from system memory 104 by issuing read request(s) containing real addresses to I/O MC 131 (or if no I/O MC is implemented, IMC 112) to obtain I/O data from the local memory 104 and by issuing read request(s) containing real addresses to IFI 114 to obtain I/O data from other memories 104. While the I/O data awaits transmission, DTL 133 may temporarily buffer the outbound I/O data in one or more of buffers 132 and 255. Importantly, buffering data in this manner protects the buffered I/O data from modification prior to transmission without requiring DTL 133 (or the requesting process) to acquiring a lock for the I/O data, thus permitting the copy of the data within system memory 104 to be accessed and modified by one or more processes. Thereafter, as illustrated at block 202, DTL 133 transmits the outbound I/O data via queue 135 and LLC 138 (and, if necessary, SER/DES 140) to communication link 150 utilizing protocol-specific datagrams and messages. Such transmission continues until all data specified by the DTCB are sent. Thereafter, the process passes to block 242, which is described below.

Referring again to block 184 of FIG. 7, in response to DTL 133 determining that the I/O operation specified within a DTCB is an I/O read operation, the process passes to block 210, which illustrates DTL 133 launching an I/O read request on network 74 via protocol logic 134 and communication link 150 to indicate a readiness to receive I/O data. The process then iterates at block 212 until a datagram is received from network 74.

In response to receipt of a datagram by protocol logic 134 from network 74, the datagram is passed to DTL 133, which preferably buffers the datagram within on eof buffers 132, 255. In addition, DTL 133 accesses TLB 124 as shown at block 214 to obtain a translation for the EA specified by the datagram. If the relevant PTE to translate the EA is buffered in TLB 124, a TLB hit occurs at block 216, DTL 133 receives the RA of the target memory location, and the process passes to block 240, which is described below. However, in response to a TLB miss at block 216, the process passes to block 220, which illustrates the OS accessing page table 264 in system memory 104 to obtain the PTE needed to translate the specified EA. While awaiting completion of the TLB reload operation, the I/O read can be stalled, or the I/O read can continue with inbound data being buffered within one or more of buffers 132 and 255, as indicated at block 230–232. Once the TLB reload operation is completed and the RA for the I/O read operation is obtained, the process proceeds to block 240, which illustrates DTL 133 storing the I/O read data (e.g., from one or more of buffers 132, 255) into one of memories 104 by issuing one or more memory write operations specifying the RA.

In some cases, for example, if an I/O read operations reads a large amount of data or if switching fabric 106 is heavily utilized or if the latency associated with memory store operations across switching fabric 106 is undesirably high, it may desirable to minimize the amount of I/O data transmitted across switching fabric 106. Accordingly, as an enhancement to the address translation process illustrated at block 214–240, the OS may selectively decide to force storage of the I/O data into the memory 104 local to the ECA 130. If so, the OS updates page table 264 to translate the EAs associated with the incoming I/O datagrams with RAs associated with storage locations in the local memory 104. As a result, the storing step illustrated at block 240 will entail storage of all of the incoming I/O data into memory locations within the shared memory region 252 of the local memory 104 based upon the EA-to-RA translation obtained at one of blocks 214 and 232.

The process proceeds from either block 202 or block 240 to block 242. Block 242 illustrates ECA 130 providing an indication of the completion of the I/O data transfer to the requesting process. The completion indication can comprise, for example, a completion field within the DTCB, a memory mapped storage location within ECA 130, or other completion indication, such as a condition register bit within a processor core 108. The requesting process may poll the completion indication (e.g., by issuing read requests) to detect that the I/O data transfer is complete, or alternatively, a state change in the completion indication may trigger a local (i.e., on chip) interruption. Importantly, in the present invention, no traditional I/O interrupt is required to signal to the requesting process that the I/O data transfer is complete. Thereafter, the process illustrated in FIG. 7 terminates at block 250.

Figure 8:
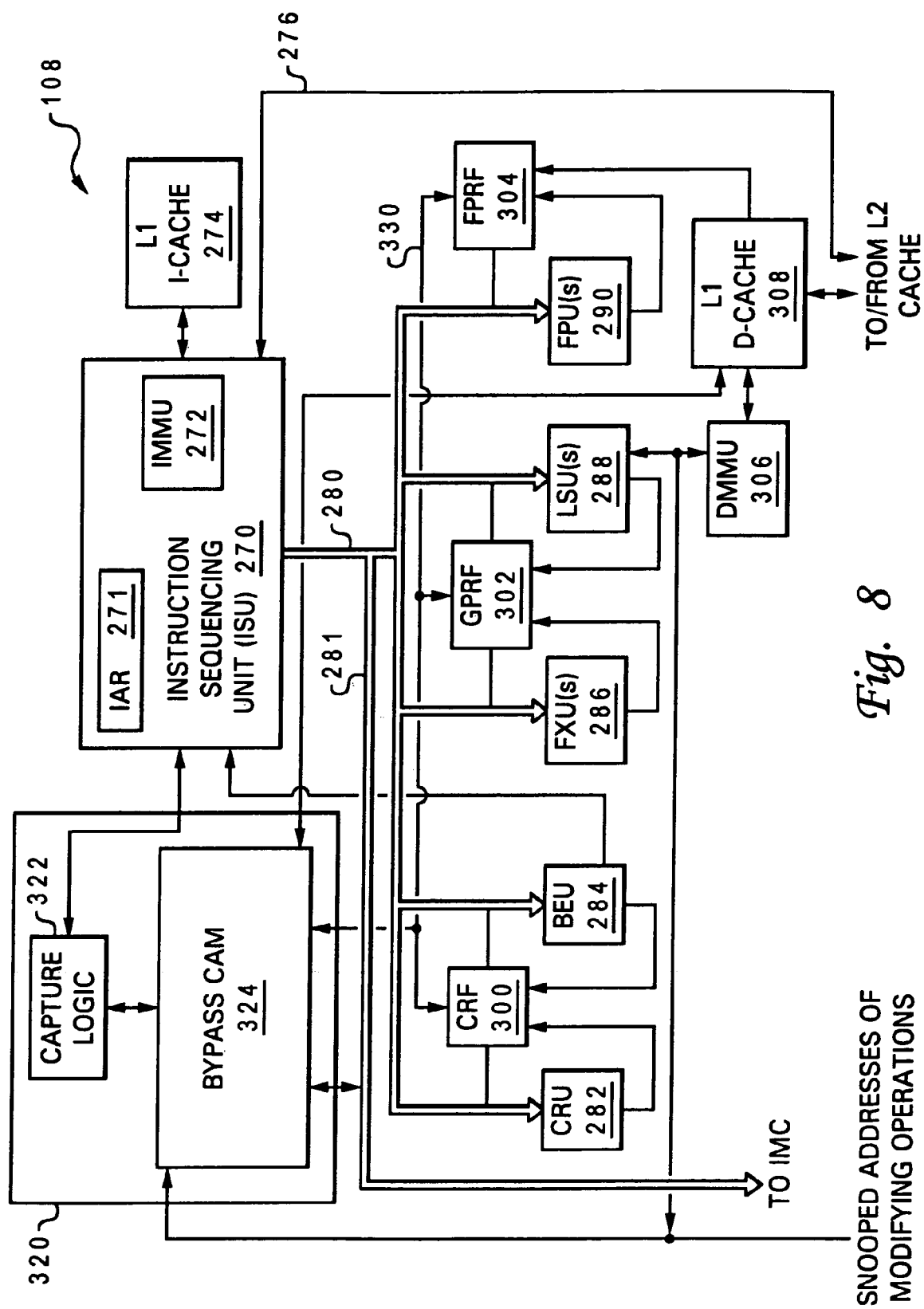
FIG. 8 is a block diagram of a processor core in accordance with a preferred embodiment of the present invention.

With reference now to FIG. 8, there is depicted a more detailed block diagram of an exemplary embodiment of a processor core 108 in accordance with the present invention.

As shown, processor core 108 contains an instruction pipeline including an instruction sequencing unit (ISU) 270 and a number of execution units 282–290. ISU 270 fetches instructions for processing from an L1 I-cache 274 utilizing real addresses obtained by the effective-to-real address translation (ERAT) performed by instruction memory management unit (IMMU) 272. Of course, if the requested cache line of instructions does not reside in L1 I-cache 274, then ISU 270 requests the relevant cache line of instructions from an L2 cache within cache hierarchy 110 (or lower level storage) via I-cache reload bus 276.

After instructions are fetched and preprocessing, if any, is performed, ISU 270 dispatches instructions, possibly out-of-order, to execution units 282–290 via instruction bus 280 based upon instruction type. That is, condition-register-modifying instructions and branch instructions are dispatched to condition register unit (CRU) 282 and branch execution unit (BEU) 284, respectively, fixed-point and load/store instructions are dispatched to fixed-point unit(s) (FXUs) 286 and load-store unit(s) (LSUs) 288, respectively, and floating-point instructions are dispatched to floating-point unit(s) (FPUs) 290.

In a preferred embodiment, each dispatched instruction is further transmitted via tracing bus 281 to IMC 112 for recording within instruction trace log 260 in the associated memory 104 (see FIG. 5). In alternative embodiments, ISU 270 may transmit via tracing bus 281 only completed instructions that have been committed to the architected state of processor core 108, or alternatively, have an associated software or hardware-selectable mode selector 273 that permits selection of which instructions (e.g., none, dispatched instructions and/or completed instructions, and/or only particular instruction types) are transmitted to memory 104 for recording in instruction trace log 260. A further refinement entails tracing bus 281 conveying all dispatched instructions to memory 104, and ISU 270 transmitting to memory 104 completion indications indicating which of the dispatched instruction actually completed. In all of these embodiments, a complete instruction trace of an application or other software program can be obtained non-intrusively and without substantially degrading the performance of processor core 108.

After possible queuing and buffering, the instructions dispatched by ISU 270 are executed opportunistically by execution units 282–290. Instruction "execution" is defined herein as the process by which logic circuits of a processor examine an instruction operation code (opcode) and associated operands, if any, and in response, move data or instructions in the data processing system (e.g., between system memory locations, between registers or buffers and memory, etc.) or perform logical or mathematical operations on the data. For memory access (i.e., load-type or store-type) instructions, execution typically includes calculation of a target EA from instruction operands.

During execution within one of execution units 282–290, an instruction may receive input operands, if any, from one or more architected and/or rename registers within a register file 300–304 coupled to the execution unit. Data results of instruction execution (i.e., destination operands), if any, are similarly written to instruction-specified locations within register files 300–304 by execution units 282–290. For example, FXU 286 receives input operands from and stores destination operands (i.e., data results) to general-purpose register file (GPRF) 302, FPU 290 receives input operands from and stores destination operands to floating-point register file (FPRF) 304, and LSU 288 receives input operands from GPRF 302 and causes data to be transferred between L1 D-cache 308 and both GPRF 302 and FPRF 304. Similarly, when executing condition-register-modifying or condition-register-dependent instructions, CRU 282 and BEU 284 access control register file (CRF) 300, which in a preferred embodiment contains a condition register, link register, count register and rename registers of each. BEU 284 accesses the values of the condition, link and count registers to resolve conditional branches to obtain a path address, which BEU 284 supplies to instruction sequencing unit 270 to initiate instruction fetching along the indicated path. After an execution unit finishes execution of an instruction, the execution unit notifies instruction sequencing unit 270, which schedules completion of instructions in program order and the commitment of data results, if any, to the architected state of processor core 108.

As further illustrated in FIG. 8, processor core 108 further includes instruction bypass circuitry 320 comprising capture logic 322 and a bypass content addressable memory (CAM) 324. As described below with reference to FIG. 10, bypass circuitry 320 permits processor core 108 to bypass repetitive code sequences, including those utilized to perform I/O data transfers, thus significantly improving system performance.

With reference now to FIG. 9, there is illustrated a more detailed block diagram of instruction bypass CAM 324. As shown, instruction bypass CAM 324 includes an instruction stream buffer 340, user-level architected state CAM 343, and a memory-mapped access CAM 346.

Instruction stream buffer 340 contains a number of buffer entries, each including a snoop kill field 341 and an instruction address field 342. Instruction address field 342 stores the address (or at least the higher order address bits) of an instruction within a code sequence, and snoop kill field 341 indicates whether a store or other invalidating operation targeting the instruction address has been snooped from an I/O channel 150, a local processor core 108 or switching fabric 106. Thus, the contents of instruction stream buffer 340 indicate whether any instruction within an instruction sequence has been changed since its last execution.

User-level architected state CAM 343 contains a number of CAM entries, each corresponding to a respective register forming a portion of the user-level architected state of a processor core 108. Each CAM entry includes a register value field 345, which stores the values of the corresponding register (e.g., within register files CRF 300, GPRF 302 and FPRF 304) as of the beginning and end of a code sequence recorded in instruction stream buffer 340. Thus, the register value fields of the CAM entries contain two "snap shots" of the user-level architected state of the processor core 108, one taken at the beginning of the code sequence and a second taken at the end of the code sequence. Associated with each CAM entry is a Used flag 344, which indicates whether the associated register value within register value field 345 was read during the code sequence before being written (i.e., whether the initial register value is critical to correct execution of the code sequence). This information is later used to determine which architected values in the CAM 343 need to be compared.

Memory-mapped access CAM 346 contains a number of CAM entries for storing target addresses and data of memory access and I/O instructions. Each CAM entry has a target address field 348 and a data field 352 for storing the target address of an access (e.g., load-type or store-type) instruction and the data written to or read from the storage location or resource identified by the target address. The CAM entry further includes a load/store (L/S) field 349 and I/O field 350, which respectively indicate whether the associated memory access instruction is a load-type or store-type instruction and whether the associated access instruction targets a an address allocated to an I/O device. Each CAM entry within memory-mapped access CAM 346 further includes a snoop kill field 347, which indicates whether a store or other invalidating operation targeting the target address has been snooped from an I/O channel 150, a local processor core 108 or switching fabric 106. Thus, the contents of instruction stream buffer 340 indicate whether work performed by the instruction sequence recorded within instruction stream buffer 340 has been modified since the instruction sequence was last executed.

Although FIG. 9 illustrates resources within bypass CAM 324 associated with one instruction sequence, it should be understood that such resources could be replicated to provide storage for any number of possibly repetitive instruction sequences.

Figure 10:
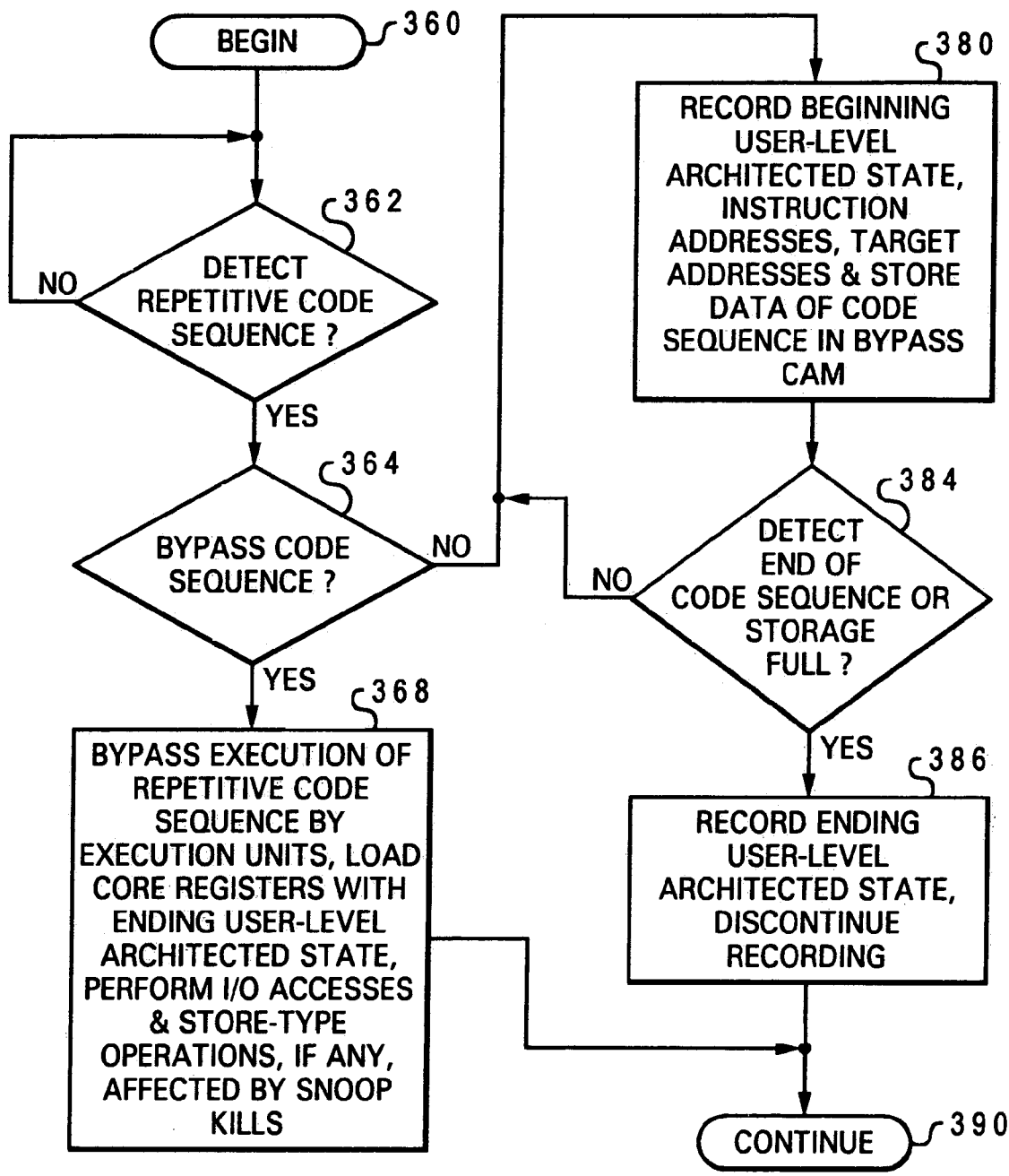
FIG. 10 is a high level logical flowchart of an exemplary method of bypassing execution of a repetitive code sequence in accordance with the present invention.

Referring now to FIG. 10, there is depicted a high level logical flowchart of an exemplary method of bypassing a repetitive code sequence during execution of a program in accordance with the present invention. As illustrated, the process begins at block 360, which represents a processor core 108 executing instructions at an arbitrary point within a process (e.g., an application, middleware or operating system process). In the processor core embodiment illustrated in FIG. 8, capture logic 322 within instruction bypass circuitry 320 is coupled to receive instruction addresses generated by ISU 270 and, optionally or additionally, instructions fetched and/or dispatched by ISU 270. For example, in one embodiment, capture logic 322 may be coupled to receive the next instruction fetch address contained in instruction address register (LAR) 271 of ISU 270. As illustrated at block 352 of FIG. 9, capture logic 322 monitors the instruction addresses and/or opcodes within ISU 270 for instruction(s), such as OS API calls, that typically are found at the beginning of code sequences that are repetitively executed. Based upon one or more instruction addresses and/or instruction operation codes (opcodes) that capture logic 322 recognizes as initiating a repetitive code sequence, capture logic 322 transmits a "code sequence start" indication to instruction bypass CAM 324 to inform instruction bypass CAM 324 that a possibly repetitive code sequence has been detected. In other embodiments, each instruction address may simply be provided to bypass CAM 324.

In response to the "code sequence start" signal or in response to an instruction address, instruction bypass CAM 324 determines whether not to bypass the possibly repetitive code sequence, as illustrated at block 364. In making this determination, bypass CAM 324 takes into account four factors in a preferred embodiment. First, bypass CAM 324 determines by reference to instruction stream buffer 340 whether or not the detected instruction address matches the starting instruction address recorded within instruction stream buffer 340. Second, bypass CAM 324 determines by reference to user-level architected state CAM 343 whether or not the value of each beginning user-level architected state register for which the Used field 344 is set matches the value of the corresponding register within processor core 108 following execution of the detected instruction. In making this comparison, the registers for which Used field 344 are reset (i.e., registers that are either not used in the instruction sequence or written before being read) are not taken into consideration. Third, bypass CAM 324 determines by reference to snoop kill fields 341 of instruction stream buffer 340 whether or not any instruction within the instruction sequence has been modified or invalidated by a snooped kill operation. Fourth, bypass CAM 324 determines by reference to snoop kill fields 347 of memory-mapped access CAM 346 whether or not any of the target addresses of the access instructions within the instruction sequence has been the target of a snooped kill operation.

In one embodiment, if bypass CAM 324 determines that all four conditions are met, namely, the detected instruction address matches the initial instruction address of a stored code sequence, the user-level architected states match, and no snoop kills have been received for an instruction address or target address of the instruction sequence, then the detected code sequence can be bypassed. In an more preferred embodiment, the fourth condition is modified in that bypass CAM 324 permits code bypass even if one or more snoop kills for the target addresses of store-type (but not load-type) instructions are indicated by snoop kill fields 347. This is possible because memory store operations affected by snoop kills can be performed to support the code bypass, as discussed further below.

If bypass CAM 324 determines that the code sequence beginning with the detected instruction cannot be bypassed, the process proceeds to block 380, which is described below. However, if bypass CAM 324 determines that the detected code sequence can be bypassed, the process proceeds to block 368, which depicts processing core 108 bypassing the repetitive code sequence.

Bypassing the repetitive code sequence preferably entails ISU 270 canceling any instructions belonging to the repetitive code sequence that are within the instruction pipeline of processing core 108 and refraining from fetching additional instructions within the repetitive code sequence. In addition, bypass CAM 324 loads the ending user-level architected state from user-level architected state CAM 343 into the user-level architected registers of processor core 108 and performs each access instruction within the instruction sequence indicated by I/O fields 350 as targeting an I/O resource. For I/O store-type operations, data from data fields 352 is used. Finally, if code bypass is supported in the presence of snoop kills to the target addresses of store-type operations, bypass CAM 324 performs at least each memory store operation, if any, affected by a snoop kill (and optionally every memory store operation in the instruction sequence) utilizing the data contained within data fields 352. Thus, if bypass CAM 324 elects to bypass a repetitive code sequence, bypass CAM 324 performs all operations necessary to ensure that the user-level architected state of processor core 108, the image of memory, and the I/O resources of processor core 108 appear as if the repetitive code sequence was actually executed within execution units 282–290 of processor core 108. Thereafter, as indicated by the process proceeding from block 368 to block 390, processor core 108 resumes normal fetching and execution of instructions within the process beginning with an instruction following the repetitive code sequence, thereby completely eliminating the need to execute one or more (and up to an arbitrary number of) non-noop instructions comprising the repetitive code sequence.

Referring now to block 380 of FIG. 10, if instruction bypass CAM 324 determines that the possibly repetitive code sequence cannot be bypassed, instruction bypass CAM 324 records the beginning user-level architected state of the detected code sequence within user-level architected state CAM 343, begins recording the instruction addresses of instructions in the detected code sequence within instruction address fields 342 of instruction stream buffer 340, and begins recording the target addresses, data results and other information pertaining to memory access instructions within memory-mapped access CAM 346. As indicated by decision block 384, instruction bypass CAM 324 continues recording information pertaining to the detected code sequence until capture logic 322 detects the end of the repetitive code sequence. In response to instruction bypass CAM 324 becoming full or capture logic 322 detecting the end of the repetitive code sequence, for example, based upon one or more instruction addresses and opcodes or the occurrence of an interruption event, capture logic 322 transmits a "code sequence end" signal to bypass CAM 324. As depicted at block 386, in response to receipt of the "code sequence end" signal, bypass CAM 324 records the ending user-level architected state of processor core 108 into user-level architected state CAM 343 and then discontinues recording. Thereafter, execution of instructions continues at block 390, with bypass CAM 324 loaded within information required to bypass the code sequence the next time it is detected.

It should be noted that the instruction bypass described herein can be implemented in speculative, non-speculative, and out-of-order execution processors. In all cases, the determination of whether or not to bypass a code sequence is based upon non-speculative information stored within bypass CAM 324 and not upon a speculative information that has not yet been committed to the architected state of the processor core 108.

It should also be understood that the instruction bypass circuitry 320 of the present invention permits an arbitrary length of repetitive code to be bypassed, where the maximum possible code bypass length is determined at least in part by the capacity of bypass CAM 324. Accordingly, in embodiments in which it is desirable to support the bypass of long code sequences, it may be desirable to implement bypass CAM 324 partially or fully in off-chip memory, such as memory 104. In some embodiments, it may also be preferable to employ bypass CAM 324 as an on-chip "cache" of the instructions to be written to instruction trace log 260 and to periodically write information from bypass CAM 324 into memory 104, for example, when an instruction sequence is replaced from bypass CAM 324. In such embodiments, the information written to instruction trace log 260 is preferably structured so that ordering of store operations is maintained, for example, utilizing a linked list data structure.

Although FIGS. 9–10 illustrate code bypass based only upon the user-level architected state for ease of understanding, it should be appreciated that additional state information, including additional layers of state information, can be taken into account in deciding whether or not to bypass a code sequence. For example, a supervisor-level architected state could also be recorded within state CAM 343 for comparison with the current supervisor-level architected state of a processor core 108 in order to determine whether to bypass an instruction sequence. In such embodiments, the supervisor-level architected state recorded within state CAM 343 is preferably a "snap shot" as of the time when an OS call is made within the instruction sequence, rather than necessarily at the beginning of the instruction sequence. In cases in which the stored and current user-level architected state match and the stored and current supervisor-level state do not match, a partial bypass of the instruction sequence can still be performed, with the bypass concluding before the instruction sequence enters the supervisor-level architected state (e.g., before the OS call).

As has been described, the present invention provides improved methods, apparatus, and systems for data processing. In one aspect, an integrated circuit includes both a processor core and at least a portion of an external communication adapter that supports input/output communication via an input/output communication link. The integration of an I/O communication adapter within the same integrated circuit as the processor core supports a number of enhancements to data processing in general and I/O communication in particular. For example, the integration of an I/O communication adapter and processor core within the same integrated circuit facilitates the reduction or elimination of multiple sources of I/O communication latency, including lock acquisition latency, communication latency between the processor core and I/O communication adapter, and I/O address translation latency. In addition, integration of the I/O communication adapter within the same integrated circuit as the processor core and its associated caches facilitates fully cache coherent I/O communication, including the assignment of modified and exclusive cache coherency states to I/O data.

In another aspect, data processing performance is improved by bypassing execution of repetitive code sequences, such as those commonly found in I/O communication processes.

In yet another aspect, testing, verification, and performance assessment and monitoring of data processing behavior is facilitated by the creation of instruction traces for each processor core within a processor memory area of an associated lower level memory.

While the invention has been particularly shown and described with reference to a preferred embodiment, it will be understood by those skilled in the art that various changes in form and detail may be made therein without departing from the spirit and scope of the invention.

What is claimed is:

1. A method of input/output (I/O) within a data processing system, said method comprising:

receiving an I/O command from a processor core at an I/O communication adapter, said I/O command referencing an effective address within an effective address space of said processor core tat identifies a control block storage location;

in response to receipt of the I/O command, said I/O communication adapter translating the effective address into a real address by reference to a translation data structure; and said I/O communication adapter accessing said control block storage location utilizing said real address to perform an I/O data transfer specified by said I/O command, wherein said step of accessing said control block storage location utilizing a real address comprises utilizing said real address to access a control block containing parameters for said I/O data transfer.

2. The method of claim 1, wherein said translation data structure comprises a translation lookaside buffer that caches copies of page table entries from an operating system page table, wherein said translating step comprises accessing a cached copy of a page table entry within the translation lookaside buffer.

3. The method of claim 2, and further comprising:

in response to a miss in said translation lookaside buffer, accessing a page table entry containing a translation for said effective address from a page table in system memory.

4. The method of claim 3, and further comprising:

while accessing said page table entry within said page table in system memory, said I/O communication adapter buffering incoming I/O read data.

5. The method of claim 1, and further comprising:
said I/O communication adapter obtaining said effective address directly from the processor core without performing a memory access.

6. The method of claim 1, wherein said I/O command indirectly references said effective address by specifying a storage location of a control block containing said effective address, said method further comprising:
said I/O communication adapter obtaining said effective address from the control block.

7. The method of claim 1, wherein said parameters include at least a portion of a foreign address identifying a remote storage location external to the data processing system.

8. The method of claim 7, wherein said at least a portion of said foreign address comprises at least a portion of an Internet Protocol address.

9. The method of claim 7, and further comprising:
said I/O communication adapter performing said I/O data transfer between said remote storage location and a local storage location within the data processing system via an I/O communication link, said performing said I/O data transfer including at least one of the set of processing outbound I/O data to implement a Layer 2 protocol of said I/O communication link and processing inbound I/O data to remove header information of said Layer 2 protocol.

10. The method of claim 9, wherein said parameters include a local address identifying said local storage location.

11. An input/output (I/O) communication adapter for a data processing system, said I/O communication adapter comprising:
means for receiving an I/O command from a processor core, said I/O command referencing an effective address within an effective address space of said processor core that identifies a control block storage location;
means, responsive to receipt of the I/O command, for translating the effective address into a real address by reference to a translation data structure; and
means for accessing said control block storage location utilizing said real address to perform an I/O data transfer specified by said I/O command, wherein said means for accessing said control block storage location utilizing a real address comprises means for utilizing said real address to access a control block containing parameters for said I/O data transfer.

12. The I/O communication adapter of claim 11, wherein said translation data structure comprises a translation lookaside buffer that caches copies of page table entries from an operating system page table, wherein said means for translating step comprises means for accessing a cached copy of a page table entry within the translation lookaside buffer.

13. The I/O communication adapter of claim 12, and further comprising:
means, responsive to a miss in said translation lookaside buffer, for accessing a page table entry containing a translation for said effective address from a page table in system memory.

14. The I/O communication adapter of claim 13, and further comprising:
means for buffering incoming I/O read data while accessing said page table entry within said page table in system memory.

15. The I/O communication adapter of claim 11, and further comprising:
means for obtaining said effective address directly from the processor core without performing a memory access.

16. The I/O communication adapter of claim 11, wherein said I/O command indirectly references said effective address by specifying a storage location of a control block containing said effective address, said I/O communication adapter further comprising:
means for obtaining said effective address from the control block.

17. The I/O communication adapter of claim 11, wherein said parameters include at least a portion of a foreign address identifying a remote storage location external to the data processing system.

18. The I/O communication adapter of claim 17, wherein said at least a portion of said foreign address comprises at least a portion of an Internet Protocol address.

19. The I/O communication adapter of claim 17, and further comprising:
means for performing said I/O data transfer between said remote storage location and a local storage location within the data processing system via an I/O communication link, said means for performing a link layer controller that processes any outbound I/O data to implement a Layer 2 protocol of said I/O communication link and that processes any inbound I/O data to remove header information of said Layer 2 protocol.

20. The I/O communication adapter of claim 19, wherein said parameters include a local address identifying said local storage location.

21. A data processing system, comprising:
the I/O communication adapter of claim 11;
a processor core coupled to the I/O communication adapter; and
a lower level memory coupled to the processor core.

22. The data processing system of claim 21, wherein at least a portion of the I/O communication adapter and processor core are integrated within the same integrated circuit chip.

23. A processing unit, comprising:
the I/O communication adapter of claim 15; and
a processor core coupled to the I/O communication adapter.

* * * * *

UNITED STATES PATENT AND TRADEMARK OFFICE
CERTIFICATE OF CORRECTION

PATENT NO. : 6,976,148 B2 Page 1 of 1
APPLICATION NO. : 10/339766
DATED : December 13, 2005
INVENTOR(S) : Arimilli et al.

It is certified that error appears in the above-identified patent and that said Letters Patent is hereby corrected as shown below:

Col. 1, line 52, please replace "*10*" with -- *I/O* --.

Col. 12, line 11, please replace "*on eof*" with --*one of*--.

Col. 18, line 40 (Claim 1), please replace "*tat*" with -- *that* --.

Signed and Sealed this

Twenty-eighth Day of November, 2006

JON W. DUDAS
*Director of the United States Patent and Trademark Office*